(12) United States Patent
Sangree et al.

(10) Patent No.: US 6,807,068 B1
(45) Date of Patent: Oct. 19, 2004

(54) OPTICAL AND ELECTRICAL SYSTEMS AND APPARATUSES INCLUDING LINE INTERFACE ASSEMBLIES AND METHODS OF OPERATION

(75) Inventors: Peter W. Sangree, Catonsville, MD (US); Christopher J. Dolle, Ellicott City, MD (US); Mark W. Ingle, Ellicott City, MD (US); Scott C. Tolle, Catonsville, MD (US); Sanjay Gupta, Bethesda, MD (US); James J. Zik, Mt. Airy, MD (US)

(73) Assignee: Corvis Corporation, Columbia, MD (US)

( * ) Notice: Subject to any disclaimer, the term of this patent is extended or adjusted under 35 U.S.C. 154(b) by 197 days.

(21) Appl. No.: 10/162,060

(22) Filed: Jun. 4, 2002

Related U.S. Application Data

(60) Provisional application No. 60/295,662, filed on Jun. 4, 2001.

(51) Int. Cl.[7] .......................... H05K 9/00; H01R 13/00; H01R 13/46
(52) U.S. Cl. .................. 361/818; 361/816; 361/800; 439/607; 439/540.1; 174/35 R; 174/35 GC
(58) Field of Search .................. 361/753, 816, 361/818, 800; 439/607–610, 92, 108, 540.1; 174/35 R, 35 GC

(56) References Cited

U.S. PATENT DOCUMENTS

| | | | | |
|---|---|---|---|---|
| 4,688,868 A | * | 8/1987 | Noyes | 439/108 |
| 5,667,407 A | * | 9/1997 | Frommer et al. | 439/610 |
| 5,838,550 A | * | 11/1998 | Morris et al. | 361/818 |
| 5,975,953 A | * | 11/1999 | Peterson | 439/607 |
| 6,123,583 A | * | 9/2000 | Huang | 439/607 |
| 6,176,728 B1 | * | 1/2001 | Bonnet et al. | 439/362 |
| 6,200,165 B1 | * | 3/2001 | Simmel | 439/609 |
| 6,210,228 B1 | * | 4/2001 | Simmel et al. | 439/609 |
| 6,281,433 B1 | * | 8/2001 | Decker et al. | 174/35 R |
| 6,388,782 B1 | * | 5/2002 | Stephens et al. | 398/79 |

* cited by examiner

*Primary Examiner*—Tulsidas Patel
*Assistant Examiner*—Dameon E Levi

(57) ABSTRACT

An apparatus with a line card having a front panel including at least one input/output port. The apparatus further includes a line card interface assembly. The line card interface assembly includes at least one of an input and output line support, at least one guide vane cooperating with said line, and a front face providing an electrical coupling with said front panel sufficient to attenuate electromagnetic waves passing through the front panel.

20 Claims, 7 Drawing Sheets

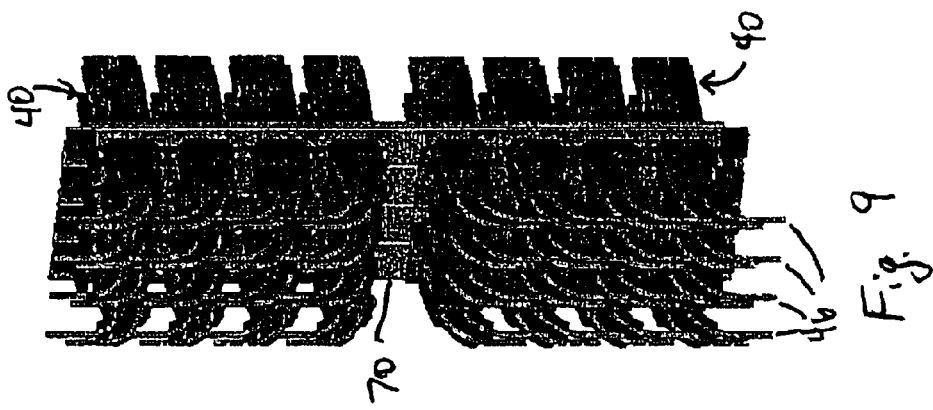
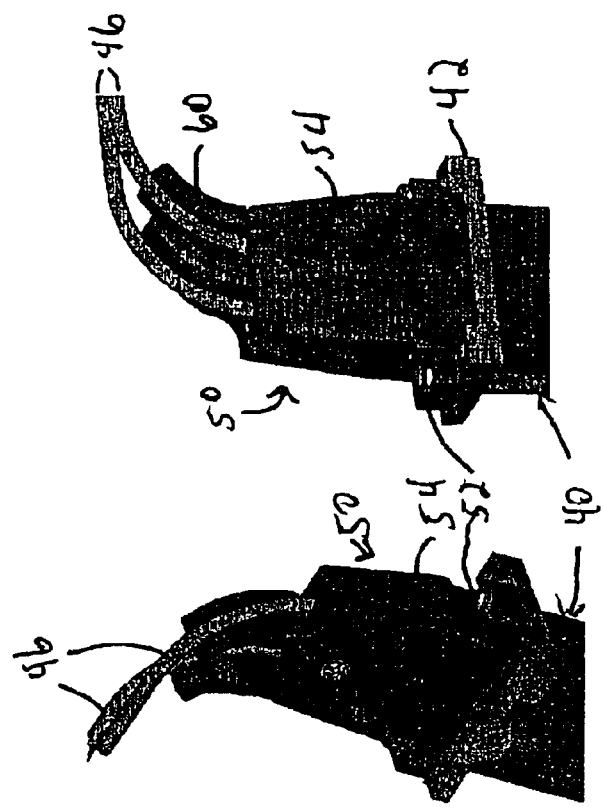
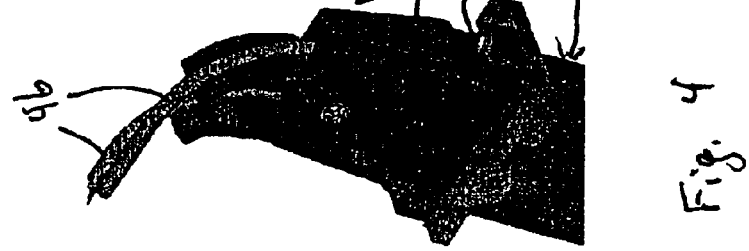
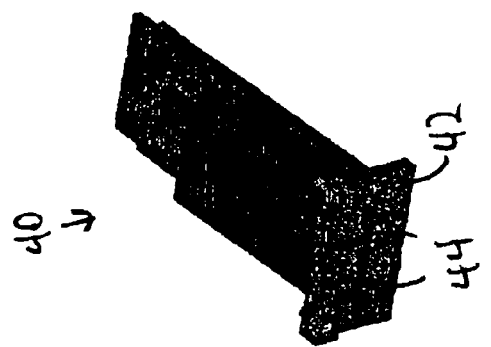

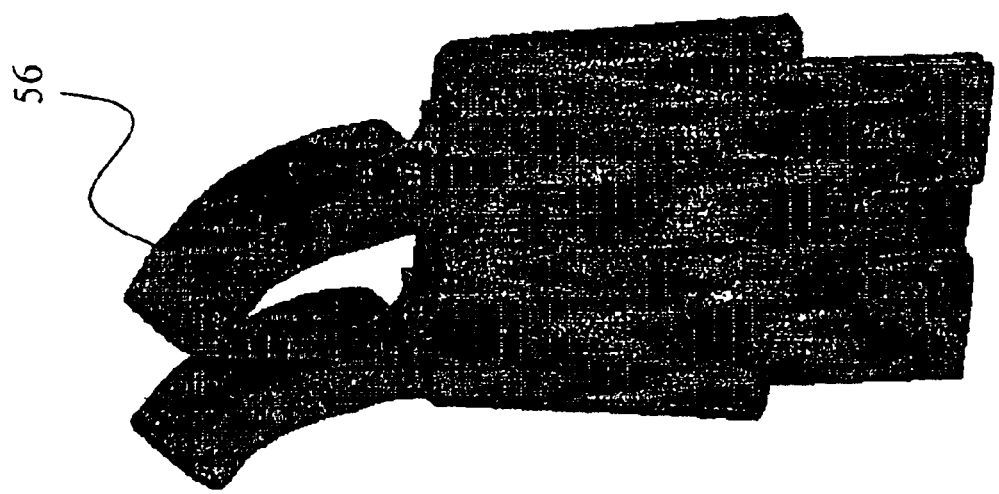
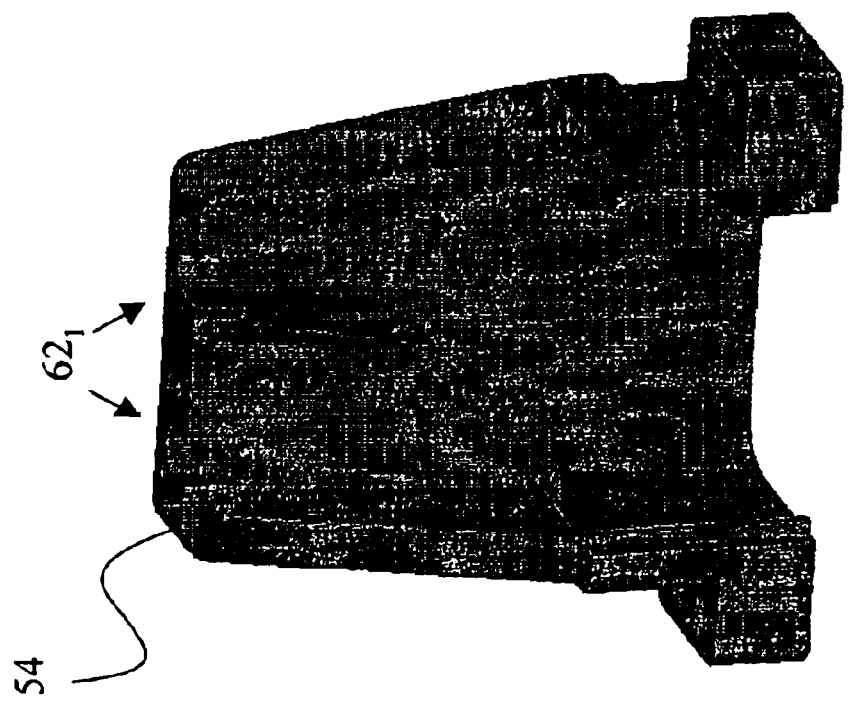
Fig. 6

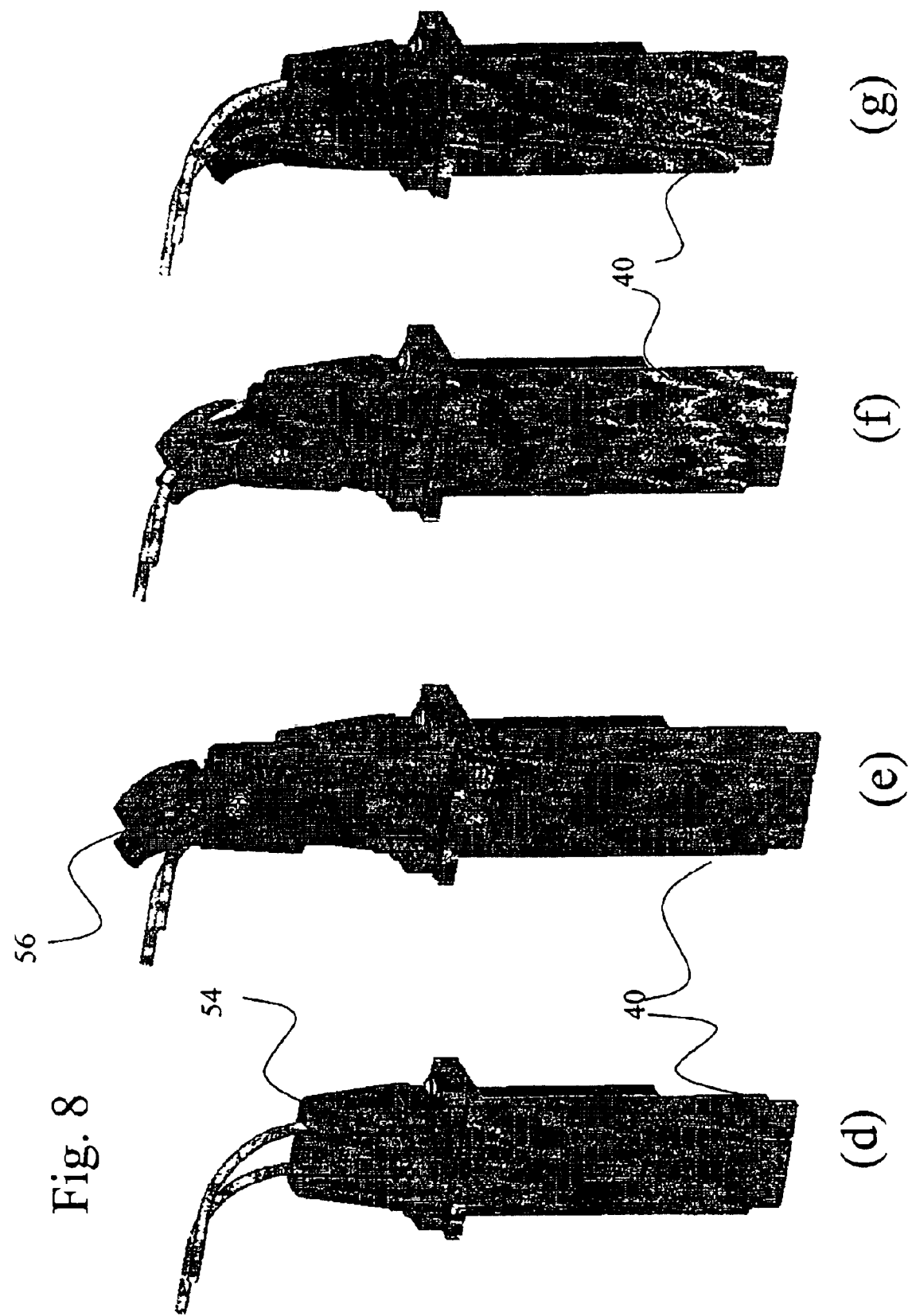

US 6,807,068 B1

OPTICAL AND ELECTRICAL SYSTEMS AND APPARATUSES INCLUDING LINE INTERFACE ASSEMBLIES AND METHODS OF OPERATION

CROSS-REFERENCE TO RELATED APPLICATIONS

This application claims priority from Provisional U.S. patent application No. 60/295,662 filed on Jun. 4, 2001.

STATEMENT REGARDING FEDERALLY SPONSORED RESEARCH OR DEVELOPMENT

Not Applicable

BACKGROUND OF THE INVENTION

The present invention is directed generally to electrical equipment. More particularly, the invention relates to optical and electrical systems having line cards with connections to input and/or output lines. The continued growth in traditional communications systems and the emergence of the Internet as a means for accessing data has accelerated demand for high capacity communications networks. Telecommunications service providers, in particular, have looked to higher capacity and performance communications equipment to handle the increased volume of communications traffic.

For example, service providers have looked to wavelength division multiplexing ("WDM") to provide higher capacity transmission systems. In WDM transmission systems, pluralities of distinct information signals are carried using electromagnetic waves having different wavelengths in the optical spectrum, typically in the infrared range. Each information carrying wavelength can include a single data stream or multiple data stream that are time division multiplexed ("TDM") together into a TDM data stream. 1 the pluralities of information carrying wavelengths are combined into a multiple wavelength, "WDM", optical signal that is transmitted in a single waveguide. In this manner, WDM systems can increase the transmission capacity of existing space division multiplexed ("SDM"), i.e., single channel, systems by a factor equal to the number of wavelengths used in the WDM system.

A difficulty that exists with higher capacity systems is the amount of equipment that is necessary to process the various signals being transmitted through the networks. The equipment generally is deployed on line cards, which are placed side-by-side in one or more shelves supported in a rack.

While it is desirable to minimize the space occupied by the components in the system, or footprint, various component properties affect the spacing in a system. In addition to physical size limitations on component spacing, other properties, such as heat generation and dissipation and electromagnetic radiation and conduction by the components affect the spacing.

For example, the input and output ports of the line cards provide a significant leakage path for electromagnetic radiation that can result in electromagnetic interference ("EMT") with surrounding electrical equipment. As a result, it is often not possible to mount electrical and optical components that radiate a significant amount of electromagnetic waves near the input and output ports of the line cards. EMI gaskets and small apertures have been used in the past to attenuate the level of the RF energy to within allowable levels per Telcordia GR-1089, which is incorporated herein by reference, and 19 other industry standards. These efforts have met with qualified success depending upon the component placement on the line cards relative to the ports. The continuing development of electrical and optical technologies will produce physically smaller components. The decrease in physical size will tend to exacerbate these other properties, which will continue to pose a substantial impediment to deploying optical and electrical equipment with smaller footprints. As such, there is a need to improve continually the physical design and packaging of electrical and optical equipment at the component, line card, shelf, and rack level for use in higher performance optical and electrical subsystems and systems.

BRIEF DESCRIPTION OF THE DRAWINGS

Embodiments of the present invention will now be described, by way of example only, with reference to the accompanying schematic drawings for the purpose of illustrating embodiments only and not for purposes of limiting the same, wherein:

FIGS. 3–9 illustrate line interface assembly embodiments.

DESCRIPTION OF THE INVENTION

The systems, apparatuses, and methods of the present invention address the above need for improved optical and electrical interfaces. The apparatuses and systems of the present invention include at least one line interface and a line interface assembly ("LIA") configured to retain at least one input and/or output line being connected to the line interface. Numerous applications exist for the present invention. For example, the present invention can be deployed in optical and electrical signal processing and transmission systems that employ line cards, shelves, and racks to house the equipment. For the sake of convenience in description, and not for limitation, the system 10 will be described further in the context of the optical system 10.

Figure 1:
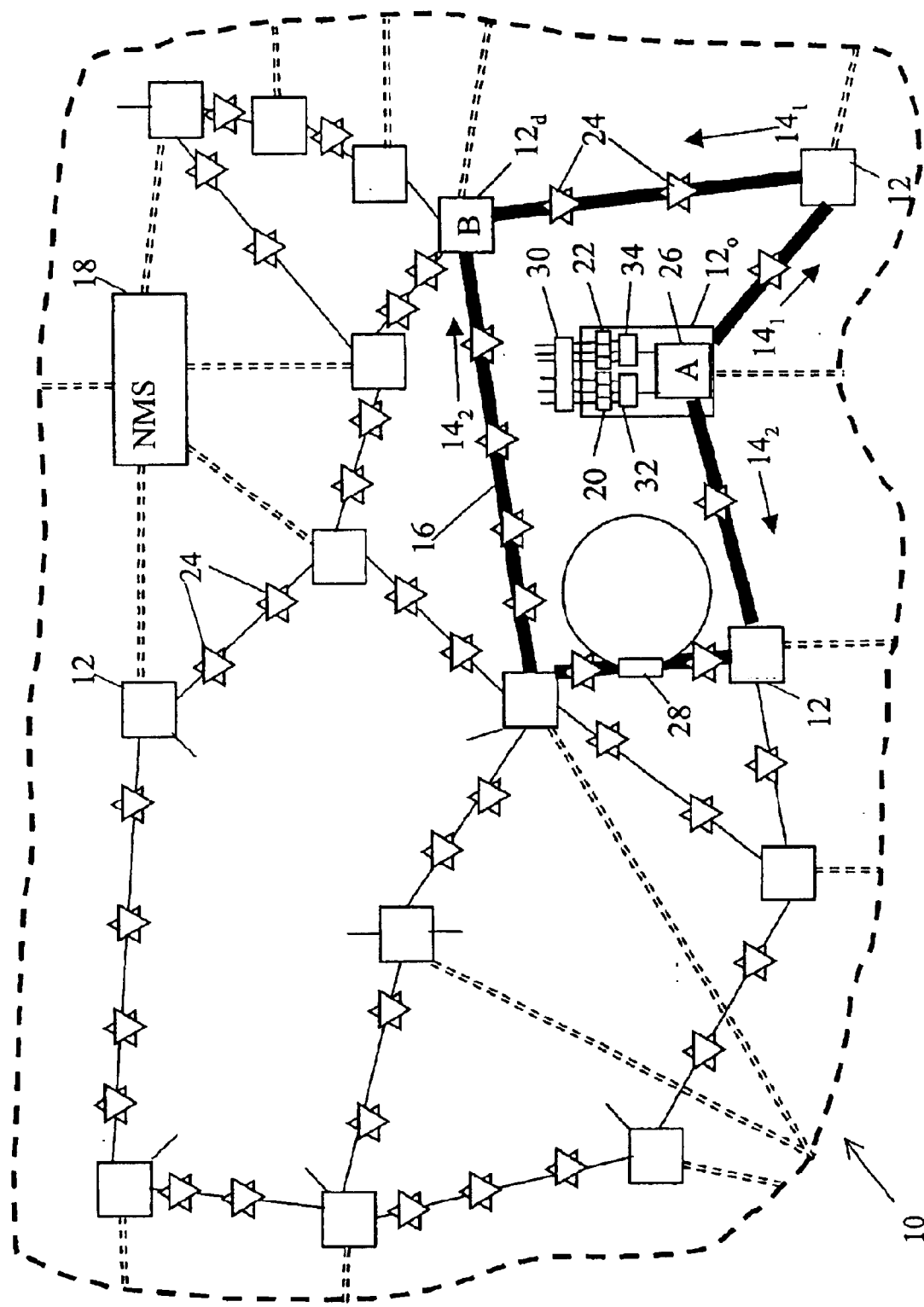
FIGS. 1 and 2 illustrate optical system embodiments.
Figure 2:
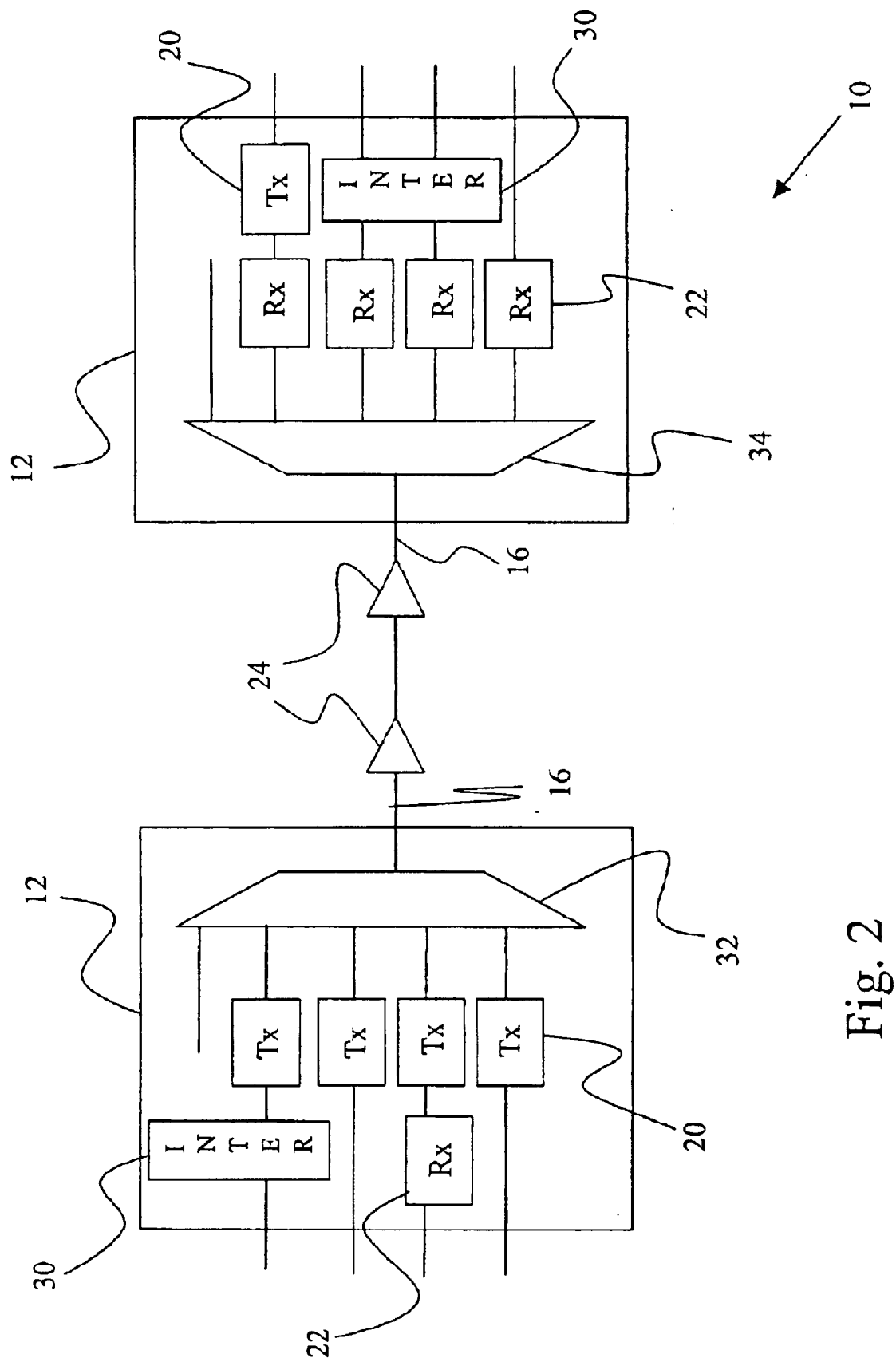

FIG. 1 illustrates an optical system 10, which includes a plurality of nodes 12 connected by optical communication paths 14. The system 10 is illustrated as a multidimensional network, although advantages of the present invention may be realized with other system configurations, such as one or more serially connected point to point links, as shown in FIG. 2. The system 10 may support one or more transmission schemes, such as space, time, polarization, wavelength and frequency division multiplexing, etc., singly or in combination within a network to provide communication between the nodes 12. The system 10 can include various transmission media 16 and be controlled by a network management system 18.

As shown in FIG. 1, optical processing nodes 12 generally can include one or more optical components, such as transmitters 20, receivers 22, amplifiers 24, optical switches 26, optical add/drop multiplexers 28, and interfacial devices 30. For example, in WDM embodiments, the node 12 can include optical switches 26 and interfacial devices 30 along with multiple transmitters 20, receivers 22, and associated equipment, such as monitors, power supplies, system supervisory equipment, etc.

In various network embodiments, multiple paths, e.g., 14*i* and 142, can be provided between nodes 12. The optical path 14 between adjacent nodes 12 is referred to generally as an optical link. The optical communication path 14 between adjacent optical components along the link is referred to generally as a span.

Various guided and unguided transmission media 16, such as fiber, planar, and free space media, can be used to form the optical communication paths 14. The media 16 supports the transmission of information between originating nodes $12_o$ and destination nodes $12_d$ in the system 10. As used herein, the term "information" should be broadly construed to include any type of data, instructions, or signals that can be transmitted.

The transmission media 16 can include one or more optical fibers interconnecting the nodes 12 in the system 10. Various types of fiber, such as dispersion shifted ("DSF"), non-dispersion shifted ("NDSF"), non-zero dispersion shifted ("NDSF"), dispersion compensating("DCF"), and polarization maintaining ("PMF") fibers, as well as others, can be deployed as transmission fiber to interconnect nodes 12 or for other purposes in the system 10. The fiber typically can support either unidirectional or bidirectional transmission of optical signals in the form of one or more information carrying optical signal wavelengths $\lambda_{si}$, or "channels". The optical signal channels in a particular path 14 can be processed by the optical components as individual channels or as one or more wavebands, each containing one or more optical signal channels.

A network management system ("NMS") 18 can be provided to manage, configure, and control optical components in the system 10. The NMS 18 generally can include multiple management layers, which can reside at one or more centralized locations and/or be distributed among the optical components in the network. The optical components can be grouped logically as network elements for the purposes of network management. One or more network elements can be established at each optical component site in the network depending upon the desired functionality in the network and management system.

The NMS 18 can be connected directly or indirectly to network elements located either in the nodes 12 or remotely from the nodes 12. For example, the NMS 18 may be directly connected to network elements serving as a node 12 via a wide area or data communication network ("WAN" or "DCN", shown in broken lines in FIG. 1). Indirect connections to network elements that are remote to the DCN can be provided through network elements with direct connections. Mixed data or dedicated supervisory channels that can be transmitted in or out of band with the signal channels on the same medium or a different medium can be used to provide connections between the network elements.

The optical transmitters 20 transmit information as optical signals via one or more signal channels $\lambda_{si}$ through the transmission media 16 to optical receivers 22 located in other processing nodes 12. The transmitters 20 used in the system 10 generally includes an optical source that provides optical power at one or more optical carrier wavelengths. The optical source can include various coherent narrow or broad band sources, such as DFB and DBR lasers, sliced spectrum sources and fiber and external cavity lasers, as well as suitable incoherent optical sources, e.g., LED, as appropriate.

Information can be imparted to the optical carrier either by directly modulating the optical source or by externally modulating the optical carrier emitted by the source. Alternatively, the information can be imparted to an electrical carrier that can be upconverted onto an optical wavelength to produce the optical signal. Electro-optic (e.g., $LiNbO_3$), electro-absorption, other types of modulators and upconverters can be used in the transmitters 20.

In addition, the information can be imparted using various modulation formats and protocols. For example, various amplitude modulation schemes, such as non-return to zero (NRZ) and return to zero (RZ) using various soliton and pulse technologies. Various frequency, phase, and polarization modulation techniques also can be employed. One or more transmission protocols, such as SONET/SDH, IP, ATM, Digital Wrapper, MPLS, Fiber Channel, Ethernet, etc. can be used depending upon the specific network application.

The optical receiver 22 used in the present invention can include various detection techniques, such as coherent detection, optical filtering and direct detection, and combinations thereof. The receivers 22 can be deployed in modules that have incorporated wavelength selective filters to filter a specific channel from a WDM signal or channel filtering can be performed outside of the receiver module. It will be appreciated that the detection techniques employed in the receiver 22 will depend, in part, on the modulation format used in the transmitter 20.

Generally speaking, N transmitters 20 can be used to transmit M different signal wavelengths to J different receivers 22. Also, tunable transmitters 20 and receivers 22 can be employed in the optical nodes 12 in a network, such as in FIG. 1. Tunable transmitters 20 and receivers 22 allow system operators and network architects to change the signal wavelengths being transmitted and received in the system 10 to meet their network requirements.

In addition, the transmitters 20 and receivers 22 can include various components to perform other signal processing, such as reshaping, retiming, error correction, differential encoding, etc. For example, receivers 22 can be connected to the transmitters 20 in back to back configuration as a regenerator, as shown in FIG. 2. The regenerator can be deployed as a 1R, 2R, or 3R regenerator, depending upon whether it serves as a repeater (repeat), a remodulator (reshape & repeat), or a full regenerator (reshape, retime, repeat).

In FIG. 2, it will be appreciated that the transmitters 20 and receivers 22 can be used in WDM and single channel systems, as well as to provide short, intermediate, and/or long reach optical interfaces between other network equipment and systems. For example, transmitters 20 and receivers 22 deployed in a WDM system can be included on a module that also includes standardized interface receivers and transmitters, respectively, to provide communication with interfacial devices 30, as well as other transmission and processing systems.

The optical amplifiers 24 can be deployed periodically along optical links 15 to overcome attenuation that occurs in a span of transmission media 16. In addition, optical amplifiers 24 can be provided proximate to other optical components, for example, at the node 12 to provide gain to overcome component losses. The optical amplifiers 24 can include doped (e.g. erbium) and non-linear interaction (e.g., Raman) fiber amplifiers that can be pumped locally or remotely with optical energy in various configurations.

For example, optical fiber amplifier 24 generally include an amplifing fiber supplied with power in the form of optical, or "pump", energy from one or more pump sources. The amplifying fiber can have the same or different transmission and amplification characteristics than the transmission fiber. Thus, the amplifying fiber can serve multiple purposes in the optical system, such as performing dispersion compensation and different levels of amplification of the signal wavelengths $\lambda_i$. The pump source 36 can include one or more narrow band or broad band optical sources, each providing optical power in one or more pump wavelength ranges designated by center pump wavelengths $\lambda_{pi}$ and including one or more modes. Pump energy can be supplied to the amplifying fiber, either counter-propagating and/or co-propagating with respect to the propagation of the signal wavelengths $\lambda_1$.

Other types of optical amplifiers, such as semiconductor amplifiers, can be used in lieu of, or in combination with the fiber amplifiers. The optical amplifiers 24 can include one or more serial and/or parallel stages that provide localized gain at discrete sites in the network and/or gain that is distributed along the transmission media 16. Different amplifier types can be included in each stage and additional stages to perform one or more other functions. For example, optical regeneration, dispersion compensation, isolation, filtering, add/drop, etc. can be included at a site along with the optical amplifier 24.

Various optical switches 26 and OADMs 28 ("switching devices") can be employed in the network. For example, the switching devices can be configured to process individual signal channels or signal channel groups including one or more signal channels. The switching devices also can include various wavelength selective or non-selective switch elements. The OADMs 28 can include wavelength reusable and non-reusable configurations. Similarly, the switching devices can be configured to provide multi-cast capability, as well as signal channel terminations.

The switching device can include various configurations of multiplexers, demultiplexers, splitters, and couplers, in combination with various switching elements configured to pass or block the signals destined for the various other nodes 12 in a selective manner. The switching of the signals can be performed at varying granularities, such as line, group, and channel switching, depending upon the degree of control desired in the system 10. The switch element can include wavelength selective or non-selective on/off gate switch elements, as well as variable optical attenuators having suitable extinction ratios. The switch elements can include single and/or multiple path elements that use various techniques, such as polarization control, interferometry, holography, etc. to perform the switching and/or variable attenuation function. The switching devices can be configured to perform various other functions, such as filtering, power equalization, telemetry, channel identification, etc., in the system 10.

Various non-selective switch elements can be used in present invention, such as mechanical line and micro-mirror ("MEM") switches, liquid crystal, magneto-optic, thermo-optic, acousto-optic, electro-optic, semiconductor and erbium doped fiber amplifier, etc. Alternatively, the switch elements can employ fixed and tunable wavelength selective multi-port devices and filters, such as those previously below.

The interfacial devices 30 may include, for example, protocol and bit rate independent devices, such as optical switches and/or protocol and bit rate dependent electrical switch devices, such as IP routers, ATM switches, SONET add/drop multiplexers, etc. The interfacial devices 30 can be configured to receive, convert, and provide information in one or more various protocols, encoding schemes, and bit rates to one or more transmitters 20, and perform the converse function for the receivers 22. The interfacial devices 30 also can be used as an input/output cross-connect switch or automated patch panel and to provide protection switching in various nodes 12 depending upon the configuration. The interfacial devices 30 can be electrically connected to the transmitters and receivers 22 or optically connected using standard optical interface transmitters and receivers, as previously described.

Optical combiners 32 can be provided to combine optical signals from multiple paths into a WDM signal on a common path, e.g. fiber, such as from multiple transmitters 20 or in a switching device. Likewise, optical distributors 34 can be provided to distribute one or more optical signals from a common path to a plurality of different optical paths, such as to multiple receivers 22 or in a switching device.

The optical combiners 32 and distributors 34 can include wavelength selective and non-selective ("passive") fiber and free space devices, as well as polarization sensitive devices. For example, one or more multi-port devices, such as passive, WDM, and polarization couplers/splitters having various coupling/splitting ratios, circulators, dichroic devices, prisms, diffraction gratings, arrayed waveguides, etc. can be employed used in the combiners 32 and distributors 34. The multi-port devices can be used alone, or in various combinations of filters, such tunable or fixed, high, low, or band pass or band stop, transmissive or reflective filters, such as Bragg gratings, Fabry-Perot, Mach-Zehnder, and dichroic filters, etc. Furthermore, one or more serial or parallel stages incorporating various 20 multi-port device and filter combinations can be used in the combiners 32 and distributors 34 to multiplex, demultiplex, and multi-cast signal wavelengths $\lambda_i$ in the optical systems 10.

In the present invention, the various network elements in the system 10 can be deployed using one or more line cards 40, which generally includes electrical circuitry used in the operation of the card 40. The circuitry typically is used in combination with various optical and electrical components mounted on or connected to the line card 40 to perform one or more functions of the network element. The line card 40 also can have one or more "daughter" cards mounted on the line card 40 depending upon the function and design of the line card 40. In addition, the line cards can include heating/cooling elements, power supplies, processors, backplane optical and/or electrical connections and other regulating, monitoring, and control elements.

As shown in FIG. 3, each line card 40 typically includes a front panel 42, which can have one or more input and/or output ports 44 that provide access to the components on the line card 40. The ports 44 can include various types of connectors, such SC, FC, etc., configured to receive a mating connector from a corresponding input or output line 46 (FIG. 4), such as optical fiber, electrical wiring and cabling, etc. Alternatively, the line 46 can be spliced or otherwise coupled to the components through the ports 44.

FIG. 4 shows a line interface assembly ("LIA") 50 connected to the front panel 42. The LIA 50 retains the input and output lines 46 that are connected to the line cards 40 via the ports 44. The LIA can be connected to the front panel 42 via one or more fasteners 52, merely cooperate with the front panel 42, or be held in relation thereto in some combination of fastening and cooperating or by some other technique.

In various embodiments, the LIA 50 is configured to form an electrical coupling with the line card 40 and an electrical path or connection to an electrical ground and/or a dissipative resistance or provide a dissipative resistance. The electrical coupling is such that electromagnetic radiation that is radiated and/or conducted out from the port 44 is attenuated via the line card or otherwise. The electrical coupling is provided to attenuate electromagnetic radiation emanating from the front panel 42 that can cause electromagnetic interference ("EMI") in the vicinity of the line card 40.

In these embodiments, the LIA can be constructed from various conductive materials to form an EMI shield. For example, a plastic material that is loaded with a conductive metal or other material, such as stainless steel fibers or nickel coated carbon fibers, can be used to form the LIA 50. It will be appreciated that various portions of the LIA can be constructed and/or coated with a conductive material to provide a desired electrical shielding profile.

The LIA 50 can assume various mechanical designs depending upon the functionality desired. For example, the LIA 50 can be formed as an integrated assembly with hinges to provide access to the assembly or multiple parts that are assembled to retain the input and output lines 46. The LIA 50 can be constructed from various materials depending upon the functionality desired in the assembly as will be described further below. In addition, the LIA 50 can be designed to capture the lines 46 within the assembly to allow the LIA 50 and lines 46 to be handled as unitary piece. In the captive embodiments, various connectors, such as snap in, snap out types, can be used to mate with the ports 44.

FIGS. 4 and 5 shows an LIA 50 embodiment employing a two piece mechanical design. A base 54 is provided that mates with a cover 56 to form the LIA 50, each of which can include varying amounts of conductive material. The mating can be via conventional means, such as an overlapping or interlocking joint, or other mating technique. One or more fasteners 52, such as screws, bolts, etc. can be used to hold the base 54 and cover 56 in position. Alternatively, the pieces can cooperate to maintain the assembly, or be held in relation thereto in some combination of fastening and cooperating Or by some other technique. Typically, a separate fastener 52 would be used to hold the assembly 50 pieces together, then is used to hold the LIA 50 in relation to the front panel 42, although a common fastener could be employed.

FIG. 6 shows a base 54 and cover 56 embodiment, in which the base 54 includes a slot to receive and retain the cover 56. The base 54 and cover 56 also include at least one cooperating threaded section to receive a fastener to secure the base 54 and cover 56. In addition, the base 54 can be mounted to the front panel without the cover 56 to provide access to the lines of the LIA 50 with disengaging the LIA 50 from the front panel 42.

In various embodiments, the LIA 50 is configured to control the physical positioning of the input and/or output lines 46 relative to the line card. FIGS. 4–6 show LIA 50 embodiments that include guide vanes 60, which protrude from the LIA and provide input and output line 46 guides. The guide vanes 60 are used to control the bend radius of the lines 46 to prevent damage that could result from kinking of the line. For example, when optical fiber is used as the input and output lines 46, it is necessary to maintain a minimum bend radius to prevent excessive attenuation in the fiber or breakage of the fiber. In addition, the vanes 46 can provide additional management of the lines 46, which is useful in densely populated shelves.

Figure 7B:
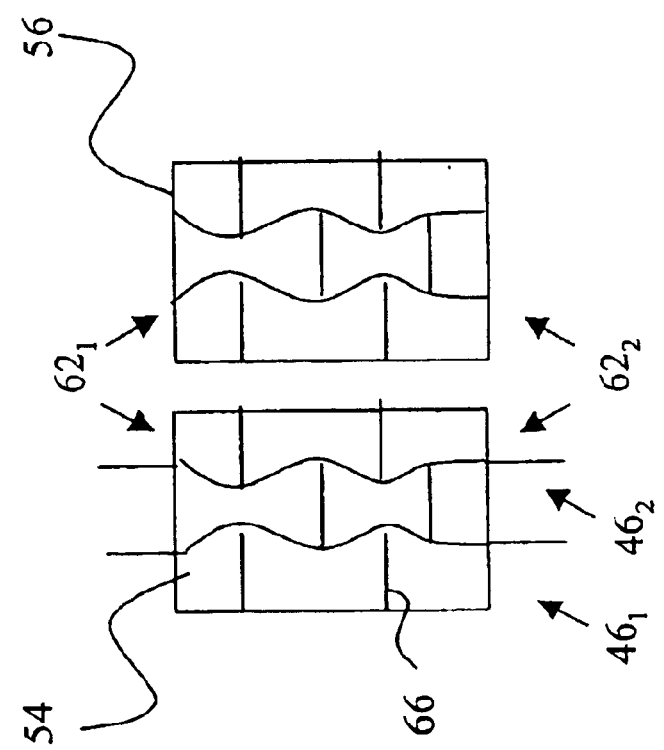
Figure 7A:
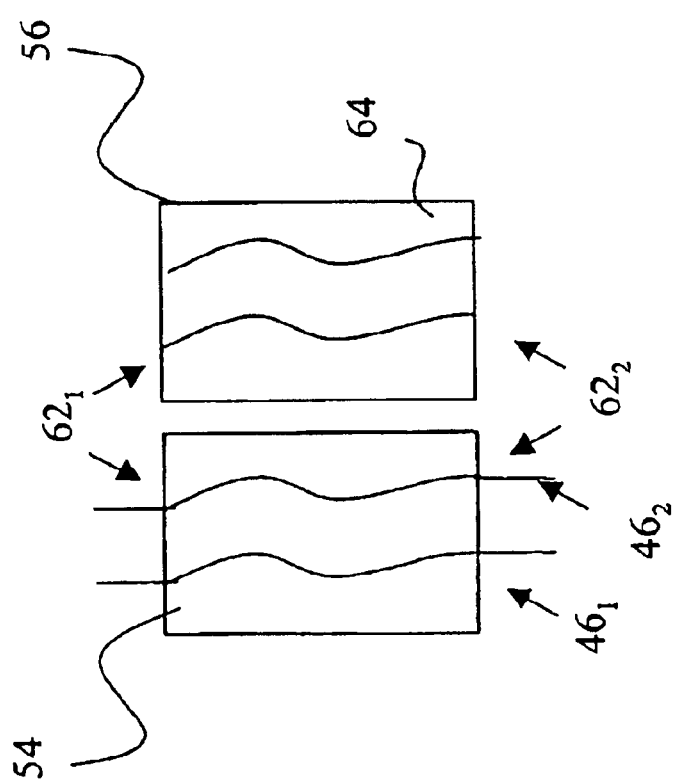

FIGS. 7a and 7b show two embodiments of the base 54 and cover 56 of the LIA 50. The assemblies 50 generally include line inputs and outputs, $62_1$ and $62_2$, respectively, that an input and/or output line support for lines 46 passing through the assembly 50.

In the FIG. 7a embodiment, a guided path 64 through the assembly is provided for two line $46_1$ and $46_2$, respectively. As shown in FIG. 7b, one or more standoffs 66 can be used to provide a tortuous path through the assembly 50 for the line 46. It is not necessary to provide guided paths 64 or standoffs 66 through the assembly 50. These devices can be used to provide a tortuous path, which can provide additional support for and management of the line 46 in the assembly 50, as well as an additional shielding to prevent the leakage of electromagnetic radiation, as previously described above.

The base 54 and/or the cover 56 can include these various mechanical attributes that provide additional functionality in the assembly 50. In addition, the base 54 and/or the cover 56 also can include support material, such as conductive or nonconductive foams or padding, which can increase the ruggedness, as well as the mechanical and electrical characteristics of the assembly. In the embodiments shown in FIGS. 4–8 the LIA 50 provides inputs and outputs for the line 46 that are in a common plane and do not require sharp or substantial bending of the line 46. Other embodiments are possible that provide various paths through the LIA 50, which may depend, in part, on the internal design of the LIA 50. It will be appreciated that the LIA 50 can provide separate, shared, or common input and output paths for the lines 46 through the assembly 50 depending upon the level of input and output line 46 management desired.

Figure 8:
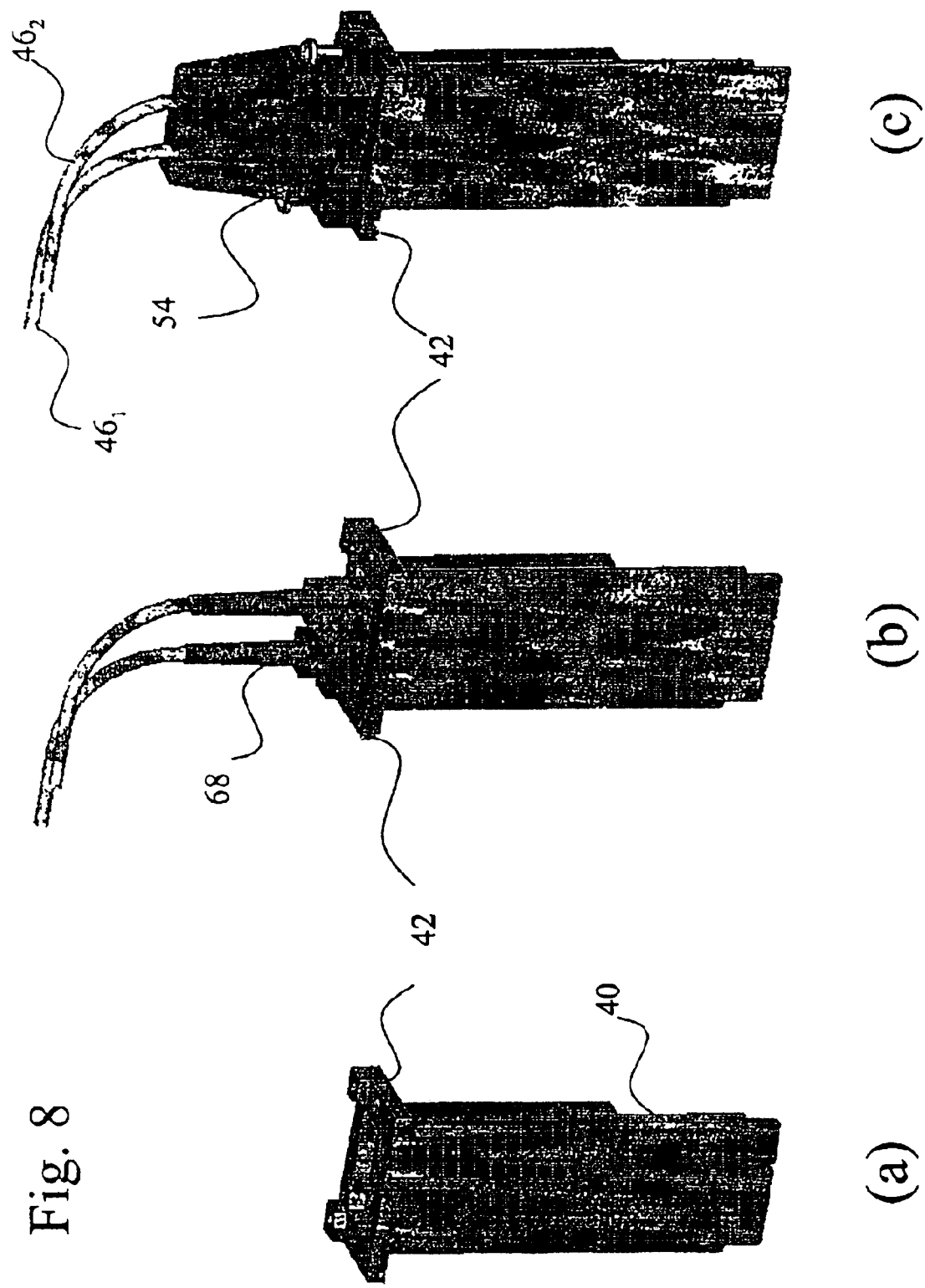

FIGS. 8(a–g) show various stages of assembly of the LIA 50 and attachment to the line card 42. FIG. 8a shows a line card 40 with front panel 42. FIG. 8b shows two lines 46 attached via connectors 68 to line card ports 44. FIGS. 8c–8d show the mounting of the base 54 onto the line card 40. FIGS. 8e–8g show the attachment of the cover 56 to the base 54. It will be appreciated that analogous procedures will be used for other embodiments, such as those in which the lines 46 are captive within the LIA 50 as previously described.

FIG. 9 shows two partial shelves 70 containing line card 40 employing the LIA 50. As illustrated, the vanes 60 provide management of the input and output lines 46. One or more shelves 70 can be provided in a rack depending upon the configuration of the network element.

In practice, the present invention provides significant benefits over the prior art. For example, it is possible to position optical and electrical component, such as laser and photo diodes, on line cards 40 proximate front panels 42 that have ports 44. This positioning capability provides for more design freedom in the layout of line cards 40 that can lead to optical and electrical systems and subsystems that provide increased performance as a function of footprint. In addition, the physical structure can further this performance by providing increased robustness and input/output line, e.g., fiber, management.

Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. An apparatus comprising:
    a line card having a front panel including at least one input/output port; and,
    a line card interface assembly having:
        at least one of an input and output line support;
        at least one guide vane cooperating with at least one of an input and output line; and
        a front face providing all electrical coupling with said front panel sufficient to attenuate electromagnetic waves passing through the front panel.

2. The apparatus of claim 1, wherein said interface assembly is at least partially constructed with conductive material.

3. The apparatus of claim 2, wherein the conductive material is a conductive coating.

4. The apparatus of claim 2, wherein said conductive material includes a plastic load with conductive metal.

5. The apparatus of claim 4, wherein the conductive metal is selected from the group of stainless steel fibers and nickel coated carbon fibers.

6. The apparatus of claim 1, wherein said assembly encloses at least one input/output port and attenuates electromagnetic radiation emanating from said at least one input/output port.

7. The apparatus of claim 1, wherein said assembly is fastened to said front panel.

8. The apparatus of claim 1, wherein said assembly includes a base and an interlocking cover.

9. A method of controlling EMI comprising:
 providing a line card having a front panel including at least one port serving as an electromagnetic path for electromagnetic radiation from the line card;
 connecting at least one of an input and output line to the port; and
 positioning a line interface assembly proximate the front panel to attenuate electromagnetic radiation passing through the port wherein positioning involves positioning a base and a cover.

10. The method of claim 9 further comprising the step of placing the line into at least one of an input and output in the base.

11. The method of claim 10 further comprising the stop of placing the line into a vane on the cover.

12. The method of claim 9 further comprising the step of fastening the assembly to the from panel.

13. The method of claim 9, wherein the base and cover interlock.

14. The method of claim 9, wherein the assembly is at least partially constructed with conductive material.

15. A system comprising:
 at least one optical transmitter; and,
 at least one optical receiver, wherein at least one of said optical transmitter and optical receiver includes:
  a line card having a front panel including at least one input/output port; and,
  a line card interface assembly having:
   at least one of an input and output line support;
   at least one guide vane cooperating with at least one of an input and output line; and
   a front face providing an electrical coupling with said front panel sufficient to attenuate electromagnetic waves passing through the front panel.

16. The system of claim 15, wherein said system includes at least one of an optical amplifier, optical switch, optical add/drop multiplexer, and interfacial device.

17. The apparatus of claim 15, wherein said interface assembly is at least partially constructed with conductive material.

18. The apparatus of claim 17, wherein said conductive material includes a plastic load with conductive metal.

19. The apparatus of claim 15, wherein said assembly encloses at least one input/output port and attenuates electromagnetic radiation emanating from said at least one input/output port.

20. The apparatus of claim 15, wherein said assembly includes a base and an interlocking cover.

* * * * *